United States Patent [19]

Kunishima et al.

[11] Patent Number: 4,768,063

[45] Date of Patent: Aug. 30, 1988

[54] SHEET MATERIAL RECEIVING DEVICE

[75] Inventors: Toshiaki Kunishima; Takeshi Ikeda, both of Yokohama; Michio Kasuya, Fuchu; Hiroaki Matsumoto; Masakatsu Iwata, both of Yokohama, all of Japan

[73] Assignee: Canon Kabushiki Kaisha, Tokyo, Japan

[21] Appl. No.: 862,153

[22] Filed: May 12, 1986

Related U.S. Application Data

[63] Continuation of Ser. No. 591,189, Mar. 19, 1984, abandoned.

[30] Foreign Application Priority Data

| | | | |
|---|---|---|---|
| Mar. 28, 1983 | [JP] | Japan | 58-50535 |
| Mar. 28, 1983 | [JP] | Japan | 58-50536 |
| Jul. 6, 1983 | [JP] | Japan | 58-121650 |
| Jul. 22, 1983 | [JP] | Japan | 58-134175 |
| Jul. 22, 1983 | [JP] | Japan | 58-134176 |
| Jul. 22, 1983 | [JP] | Japan | 58-114088[U] |
| Jul. 27, 1983 | [JP] | Japan | 58-135868 |
| Aug. 3, 1983 | [JP] | Japan | 58-142062 |
| Aug. 3, 1983 | [JP] | Japan | 58-120909[U] |
| Aug. 9, 1983 | [JP] | Japan | 58-145543 |
| Aug. 9, 1983 | [JP] | Japan | 58-123663[U] |

[51] Int. Cl.[4] .......... G03B 24/00; B26D 7/06; B26D 7/00

[52] U.S. Cl. .......... 355/29; 83/186; 83/167; 83/205; 271/207; 271/220; 355/3 SH; 355/14 SH

[58] Field of Search .......... 83/203, 205, 167; 271/175, 186, 207, 213, 215, 220; 355/3 SH, 13, 133, 29, 14 SH

[56] References Cited

U.S. PATENT DOCUMENTS

| | | | |
|---|---|---|---|
| 3,001,789 | 9/1961 | Emslie et al. | 271/215 |
| 3,245,330 | 4/1966 | Okishima | 83/446 X |
| 3,556,513 | 1/1971 | Howard | 271/207 X |
| 3,779,641 | 12/1973 | Hauck | 83/446 X |
| 3,847,391 | 11/1974 | Brant et al. | 271/220 |
| 3,884,103 | 5/1975 | Namba | 83/205 X |
| 3,904,192 | 9/1975 | Pfeifer | 271/186 |
| 4,046,470 | 9/1977 | Yamamoto | 83/205 X |
| 4,221,378 | 9/1980 | Kamath et al. | 271/220 |
| 4,300,757 | 11/1981 | Koiso | 271/207 |

FOREIGN PATENT DOCUMENTS

| | | |
|---|---|---|
| 170047 | 12/1977 | Japan . |
| 152473 | 10/1979 | Japan . |
| 112153 | 8/1981 | Japan . |
| 11463 | 1/1983 | Japan . |

OTHER PUBLICATIONS

IBM Technical Disclosure Bulletin, vol. 15, No. 7, p. 2194, Dec. 1972.

*Primary Examiner*—Paul A. Bell

*Attorney, Agent, or Firm*—Fitzpatrick, Cella, Harper & Scinto

[57] ABSTRACT

This specification discloses a sheet material receiving device provided near the lower part of the sheet material discharging portion of an image forming apparatus such as a facsimile apparatus or a copying apparatus to receive sheet materials discharged from the image forming apparatus. The sheet material receiving device is provided with a first guide member against which the leading end of each discharged sheet bears and by which the sheet is directed downwardly, and a second guide member opposed to the first guide member and forming a sheet receiving space, and has a gripping portion for holding down the sheet material received in the sheet receiving space, or the first guide member is openable.

19 Claims, 15 Drawing Sheets

SHEET MATERIAL RECEIVING DEVICE

This application is a continuation of application Ser. No. 591,189 filed Mar. 19, 1984, now abandoned.

BACKGROUND OF THE INVENTION

1. Field of the Invention

This invention relates to a sheet material receiving device, and more particularly to a sheet material receiving device provided near the lower part of the sheet discharging portion of an image forming apparatus such as a facsimile apparatus or a copying apparatus to receive sheet materials discharged from the image forming apparatus.

2. Description of the Prior Art

In recent years, compactness and light weight of image forming apparatuses such as facsimile apparatuses or copying apparatuses have been particularly strongly desired. As a result, it has heretofore been usual that the tray for receiving recording paper sheets, originals and other sheet materials discharged from the image forming apparatus is not incorporated in the apparatus body but is mounted in a jutting-out relationship with the apparatus and correspondingly the apparatus body is made compact.

As a result, even if the apparatus body is made compact, the jutting-out tray makes the installation space correspondingly larger and this has led to a disadvantage that the compactness in the true sense of the word has not yet been achieved.

Also, rolled paper such as thermosensitive recording paper used in facsimile or the like has a strong curling tendency and it has been difficult to receive such paper on the linear surface of the tray in good order.

Recently, to meet the requirement for compactness of the apparatus body, there is a tendency of keeping the length of the paper unchanged and reducing the outside diameter of the rolled paper as much as possible and therefore, a method of reducing the diameter of the roll core as much as possible is adopted with a result that the curling tendency of the paper becomes more remarkable, and development of a paper receiving method which can cope therewith is strongly desired.

Also, when records of a plurality of originals are to be made by such an image forming apparatus, if recording is effected in succession from the first page of the originals, the recorded sheets discharged from the apparatus are discharged with their image bearing surfaces facing upward and thus, the recorded sheets received in the tray of the conventional type are piled in succession with the first page as the lowermost sheet and the second and subsequent pages overlying the first page, and the sheets piled on the tray are opposite in order to the originals. Therefore, the operation of re-arranging the recorded sheets in the order from the first page after completion of the recording operation, i.e., the paginating operation, must be carried out, and this has been very much time-consuming.

An example of the prior art will hereinafter be described with reference to FIG. 1 of the accompanying drawings.

FIG. 1 shows an example of the facsimile apparatus provided with a conventional sheet material receiving tray of this type. The facsimile apparatus 1 shown there is provided with an image reading and transmitting system for reading information from an original by an optical system 3 while feeding the original on an original supporting table 2, and transmitting the image information, and an image receiving and recording system for recording the image on thermosensitive recording paper 6 by a thermal head 7, the recording paper 6 being paid away from a recording paper roll 4 in accordance with the received image information and transported by a platen roller 5. Designated by 8 is a power source unit including a power source device.

On the left side of the image forming apparatus body 1, there is provided an original receiving tray 10 for receiving originals 9 successively fed out from the original supporting table 2, and on the right side of the apparatus body 1, there is provided a recording paper receiving tray 12 for receiving recording paper having images recorded thereon by the thermal head 7 and thereafter cut to a predetermined length, for example, the length of format A4, by a cutter 11.

In such a conventional image forming apparatus, the trays 10 and 12 jut out on the opposite sides of the apparatus body 1 and therefore, even if the apparatus body is made compact, these jutting-out trays prevent the actual installation space from being very much reduced. If both of these trays are installed only on one side of the apparatus body, the installation space may be reduced by an amount corresponding to one tray, but in such case, the two driving systems for originals and recording paper, respectively, will be concentrated on one side of the apparatus body, and this will aggravate the spatial efficiency of the interior of the apparatus body and will complicate the driving systems, and this in turn may lead not only to reduced reliability but also to greatly increased cost.

Also, recording paper sheets discharged onto the tray 12 are discharged with their image bearing surfaces facing upward and therefore, when a plurality of sheets of records are to be prepared in succession, the recording paper sheets are piled in such a manner that the first page is the lowermost sheet and the last page is the uppermost sheet and accordingly, pagenation becomes necessary after completion of the recording operation.

SUMMARY OF THE INVENTION

It is an object of the present invention to eliminate the above-noted disadvantages peculiar to the sheet material receiving device used in the conventional image forming apparatus as described above and to provide a sheet material receiving device which can be mounted on an apparatus body without greatly jutting out of the apparatus body and enables the entire apparatus body to be compact.

It is another object of the present invention to provide a sheet material receiving device which can reliably hold a number of sheet materials therein and can properly hold even sheet materials having a strong curling tendency.

It is still another object of the present invention to provide a sheet material receiving device which enables sheet materials to be easily taken out.

It is yet still another object of the present invention to provide a sheet material receiving device which can receive a number of sheet materials in succession so as to eliminate the necessity of carrying out the pagenating operation after the sheet materials have been received in the receiving device.

It is a further object of the present invention to provide a sheet material receiving device which can cope with even a great quantity of sheet materials fed out.

The sheet material receiving device of the present invention can attain the effect that the leading end of each sheet material is inserted into a blockading portion below a sheet material receiving space while the trailing end thereof is reversed and hangs outwardly of the apparatus, whereby the installation space of the apparatus can be remarkably reduced without causing any special tray to jut out from the apparatus body and moreover the sheet materials can be received in good order irrespective of the curling tendency of the sheet materials. Moreover, the sheet material receiving device of the present invention can receive a plurality of sheet materials into a tray with the information bearing surfaces thereof facing upward and in the order of pages and can attain not only the improvement of the installation space but also a great improvement in the operability such as handling of sheet materials. Also, sheet materials are directed into the tray immediately after they have passed through a cutter, and this leads to the elimination of the necessity of providing a paper discharge roller and to the simplicity of the mechanism, which in turn leads to greatly reduced cost and enhanced reliability.

Also, unlike the conventional method of supporting sheet materials on the tray, the tray of the device of the present invention is for holding only the leading end of each sheet material and can therefore receive even remarkably long sheet materials.

In the present invention, to make the holding of sheet materials more effective, a plate spring or a friction piece can be attached to the leading end holding portion, thereby enhancing the holding effect.

Also, a safety mechanism for automatically opening the tray whenever a number of sheet materials exceeding the receiving capacity of the receiving device has come is provided in the receiving device, whereby sheet materials can be prevented from jamming in the apparatus.

Further, in the present invention, where a number of sheets exceeding the receiving capacity cf the receiving space formed between two guide members when a first guide member is positioned in opposed relationship with a second guide member are to be received without injuring the intrinsic function of the aforementioned tray having the function of nipping the leading end of each discharged sheet, the first guide member may be moved to its closed position and an external receiving device may be connected thereto, thereby copying with a great quantity of sheet materials.

Further, according to the present invention, when a sheet material is to be cut to a predetermined length at the sheet discharge port of the image forming apparatus, the trailing end of the sheet material is forced by rotation of the cutting edge of the cutter to depend or hang outwardly of the apparatus while being reversed and therefore, even when the curling tendency of the cut sheet material is strong or the length of the cut sheet material is relatively short, the trailing end of the sheet material can be reversed outwardly of the apparatus, thereby positively attaining the intended effect as described above.

Furthermore, the present invention adopts a structure in which irrespective of the length of the record, recording paper is cut to a predetermined length or greater from the bottom of the recording paper receiving portion without fail and therefore, the second and subsequent recording paper sheets can be directed to the receiving portion always along the inside of the preceding recording paper sheet and never jut out of the apparatus as has heretofore been experienced.

The present invention is of course applicable not only to the reception of recording paper but also to the reception of originals.

While the above-described embodiment has been described with respect only to an apparatus in which continuous paper is cut, the present invention is of course applicable also to an apparatus using pre-cut paper.

The invention will become more fully apparent from the following detailed description thereof taken in conjunction with the accompanying drawings.

DESCRIPTION OF THE PREFERRED EMBODIMENTS

The sheet material receiving device of the present invention will hereinafter be described with respect to some embodiments shown.

Figure 1:
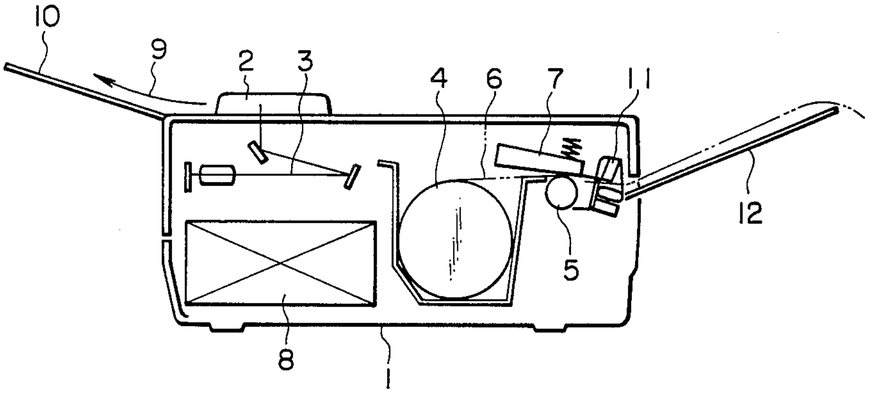
FIG. 1 PRIOR ART
FIG. 1 is a schematic view of a facsimile apparatus according to the prior art.
Figure 2:
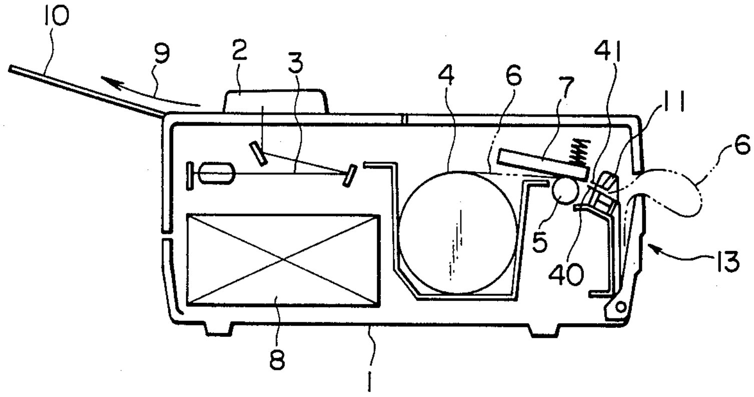
FIG. 2 is a schematic view of a facsimile apparatus having a tray according to the present invention mounted thereon.

FIG. 2 shows the facsimile apparatus of FIG. 1 which is provided with a sheet material receiving tray according to the present invention. In FIG. 2, portions similar to those shown in FIG. 1 are given similar reference numerals and need not be described. Designated by 40 and 41 are paper guides.

Figure 3:
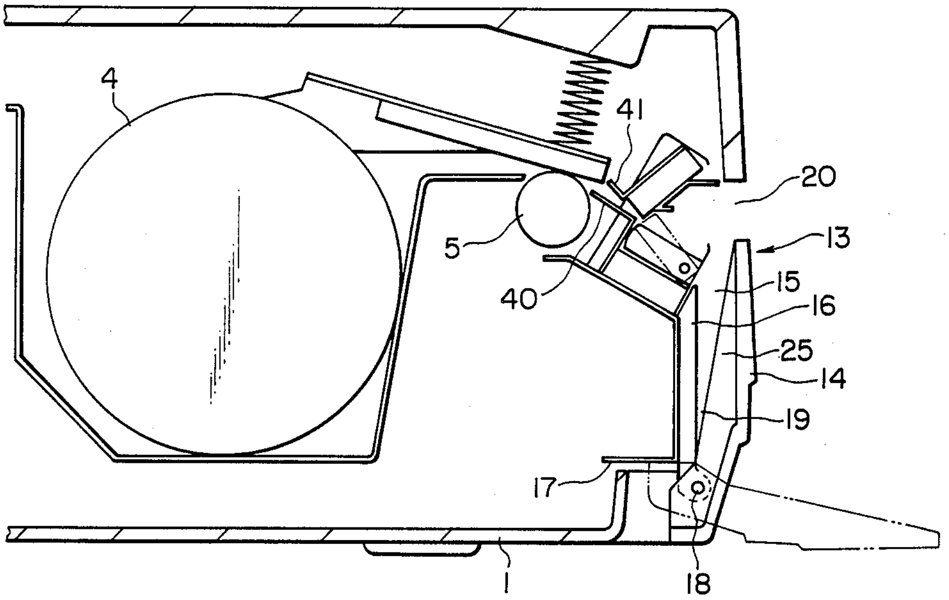
FIG. 3 is an illustration in which the recording paper receiving portion of the facsimile apparatus shown in FIG. 2 is closed.

A sheet material receiving tray 13 according to the present invention is provided near the lower portion of the recording paper sheet discharge port of the above-described facsimile apparatus. The details of the sheet material receiving tray 13 are shown in FIG. 3. As shown in FIG. 3, the sheet material receiving tray 13 is comprised of a first guide member 14 for downwardly guiding discharged sheets and a second guide member 16 opposed to the first guide member to form a sheet receiving space 15. The second guide member 16 comprises a plastic plate or the like fixed to the stay 17 of the facsimile apparatus body 1, and the lower end of the first guide member 14 is connected to the lower end of the second guide member by a pin 18. In the embodiment illustrated, these guide members are shown as plates, whereas they need not always be plates but may be, for example, members comprising a plurality of wires arranged longitudinally, and briefly may be any members which are capable of blocking movement of recording paper and guiding it into the receiving space 15.

Figure 4:
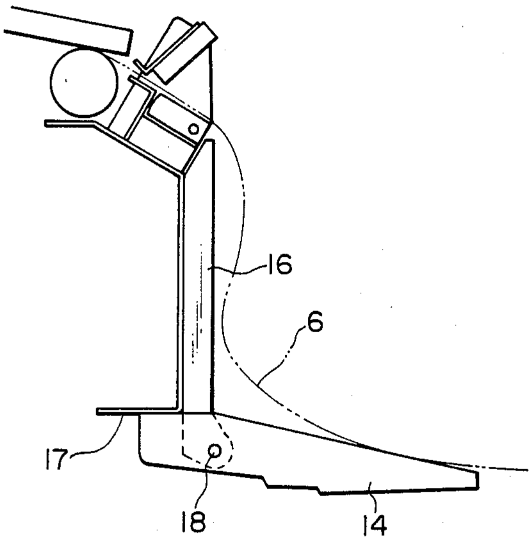
FIG. 4 is an illustration in which the recording paper receiving portion is opened.

Provided between the facsimile apparatus body 1 and the first guide member 14 is a click mechanism, not shown, for restraining the first guide member 14 in the state as shown in FIG. 3, and the first guide member 14 is normally held in its closed position (operative position) shown in FIG. 3. As its lower end, the first guide member 14 is pivotally connected to the second guide member by the pin 18, and the first guide member 14 is designed to be movable between a closed position (a position indicated by solid line in FIG. 3) in which it is opposed to the second guide member 16 to form the sheet material receiving space 15 and a substantially horizontal open position (a position indicated by dots-and-dash line in FIG. 3) in which it is spaced apart from the second guide member 16. Between the apparatus body 1 and the first guide member 14, there is provided a click mechanism (not shown in FIG. 3) to hold the first guide member 14 in the closed position as long as a quantity of recording paper sheets corresponding to the receiving capacity of the sheet material receiving space 15 is fed out, and when a quantity of recording paper sheets exceeding the receiving capacity of the sheet material receiving space 15 is fed out, the first guide member 14 is moved to the open position (non-operative position) and in this position, the first guide member 14 is restrained by the stay 17 of the body 1 and held substantially horizontally. As shown in FIG. 4, in the open position of the first guide member 14, discharged recording paper 6 is moved along the first guide member 14 and accordingly, in this case, the first guide member 14 forms a discharge guide portion.

When the length of the recording paper is short or too long, the first guide member 14 may preferably be used in its open position. Also, when a great quantity of recording paper sheets is received at a time and the quantity exceeds the receiving capacity, the click mechanism for restraining the first guide member 14 in the closed position can be automatically released by the weight of the received recording paper sheets and the first guide member 14 may be brought into its open position.

In the sheet material receiving device of the present invention, there is provided an external receiving device for receiving a great quantity of recording paper sheets fed out along the discharge guide portion formed by the first guide member 14 when moved to its open position as described above, whereby the sheet material receiving tray can cope with the great quantity of recording paper sheets.

Figure 17A:
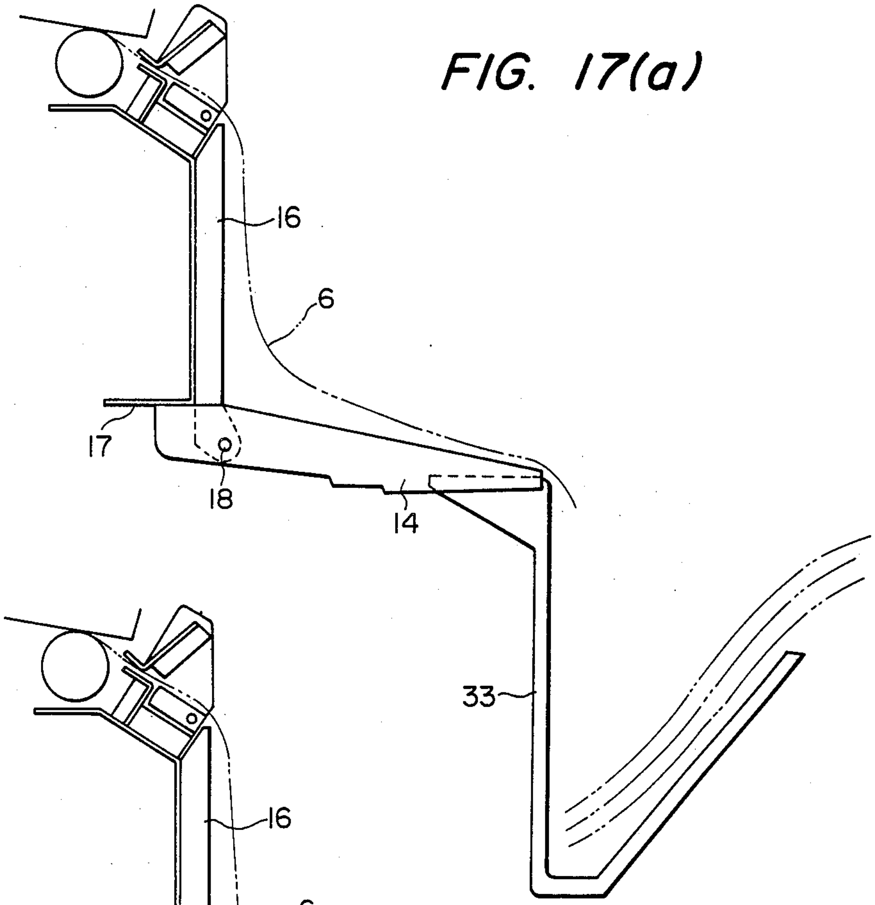
FIGS. 17(*a*) and (*b*) show embodiments of the external receiving device connected in a condition in which the first guide member is in its open position.
Figure 17B:
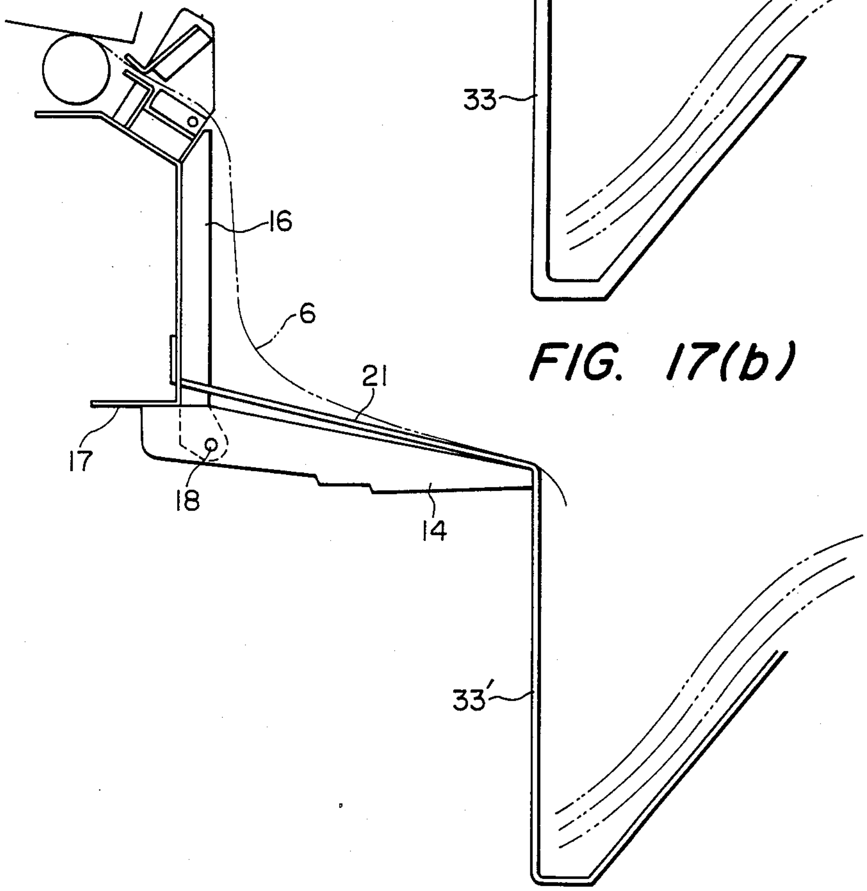

FIG. 17(*a*) shows an embodiment of such external receiving device. The external receiving device (removably mountable) 33 shown in FIG. 17(*a*) is connected to the fore end of the first guide member 14 in a condition in which the first guide member 14 has been moved to its open position, and receives the recording paper 6 fed out from the fore end of the first guide member 14.

FIG. 17(*b*) shows another embodiment of the external receiving device. The external receiving device 33' shown in FIG. 17(*b*) is comprised of, for example, a wire type tray and in its base portion, it is hung on the machine body or the second guide member 16 and held in its position shown, and receives the recording paper 6 in the same manner as the external receiving device shown in FIG. 17(*a*).

Such external receiving device 33, 33' has a substantially V-shaped cross-section and therefore, if the receiving device 33, 33' is connected in a condition in which the first guide member 14 is opened, the first guide member 14 serves also as the guide for the recording paper 6 and can guide the severed recording paper 6 into the external receiving device 33, 33'. Accordingly, this is suitable for a case where a great deal of recording is effected continuously.

Further, the above-described sheet material receiving tray is designed to grip the leading end of the recording paper fed out from the facsimile apparatus into the tray when the first guide member 14 is held in its closed position indicated by solid line in FIG. 3, to reverse the trailing end of the recording paper and to hold it in a condition depending out of the tray.

A narrow blockading portion 19 for gripping the leading end of a downwardly fed sheet material is formed in the lower portion of the sheet material receiving space 15 formed between the first guide member 14 and the second guide member 16 in the closed position of the first guide member 14 as shown in FIG. 3. In the embodiment illustrated, the sheet material receiving space 15 is formed into a V-shaped and the blockading portion 19 is formed at the bottom thereof, whereas this space need not always be V-shaped, but the wall surfaces formed by the two members at the lower end may be somewhat spaced apart from each other. Also, the angle formed between the recording paper and the first guide member 14 in its closed position may be an obtuse angle so that the recording paper may be smoothly guided downwardly into the receiving space 15 while bearing against the guide member 14.

The angle formed between the first guide member 14 and the recording paper, more exactly, the angle formed between the end edge of a reinforcing rib 25 and the recording paper being fed out, may be an obtuse angle so that the recording paper 6 may be smoothly guided to the lower end of the receiving space 15 while keeping contact with the reinforcing rib 25 of the first guide member 14.

In the case of the present embodiment, the distance over which the recording paper 6 passes through a cutter 11 and arrives at the second guide member 16 is short and therefore, the angle formed between the recording paper being fed and the second guide member 16 also is an obtuse angle.

Figure 5:
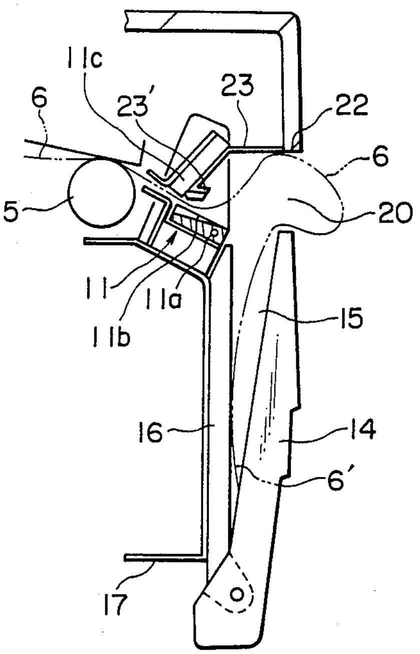
FIG. 5 illustrates the loop condition of paper in the paper receiving portion according to the present invention.
Figure 11:
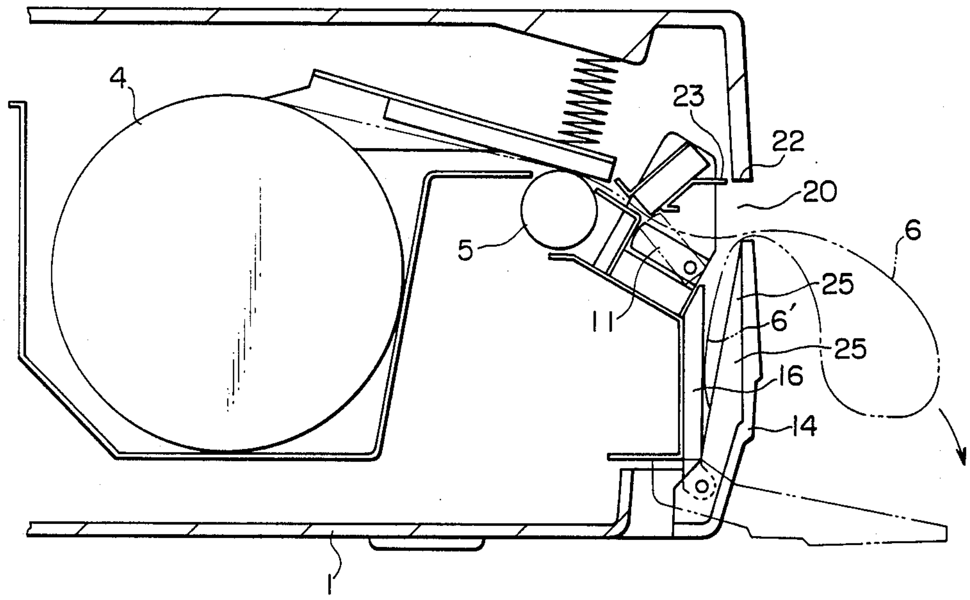

Further, at the upper end of the first guide member 14 when in its closed position, there is formed an opening portion 20 which permits reversal of the trailing end of the recording paper gripped at its leading end by the gripping portion 19, and above the discharge portion for recording paper, namely, above the cutter 11, there is disposed a guide member 23 for guiding outwardly of the opening portion 20 a loop formed as shown in FIG. 5 by a sheet discharged from the discharge portion after gripped at its leading end by the gripping portion 19 as described above. In this manner, the opening portion 20 sufficient for the loop-like recording paper 6 to be discharged is formed between the upper end of the first guide member 14 and the upper case 22 and guide member 23 of the body 1. The loop is discharged out of the apparatus with the upper surface of the guide member 23 and the end surface of the upper case 22 as the guide surfaces and at last, as shown in FIG. 11, it becomes greatly curled and depending outwardly of the apparatus body. In that case, the guide member disposed above said discharge portion performs the important function of reliably guiding the loop formed at the trailing end of the sheet out of the apparatus through the opening portion formed at the upper end of the first guide member.

As described above, the cutter 11 is disposed in the sheet discharging portion of the facsimile apparatus, and this cutter 11 is provided with a cutting edge which cuts the recording paper 6 being discharged and then is rotated in a direction to move the trailing end of the cut recording paper toward the opening portion 20. That is, as shown in FIG. 5, the cutter 11 has a movable cutting edge **11*b* rotatable about a shaft 11*a* and a fixed cutting edge 11*c* cooperating with the movable cutting edge 11*b*, and is designed to cut the recording paper 6 by the movable cutting edge 11*b* being rotated clockwise about the shaft 11*a* as viewed in FIG. 5 and to push the trailing end of the cut recording paper 6** to the right.

Accordingly, when the leading end 6' of the recording paper 6 is directed into the wedge-shaped receiving space 15 of the receiving tray 13 and this leading end is seized in the bottom of the receiving space and at the same time the trailing end portion of the recording paper continuously paid away is cut by the cutter 11, the trailing end of the recording paper is fed out of the apparatus while being reversed by the resiliency of the paper and the action of the rotational force of the cutting edge of the cutter, and reception of the recording paper is completed with the leading end 6' of the recording paper 6 being seized in the apparatus and the trailing end thereof depending outwardly of the apparatus and thus, the operation can be connected to the reception of the next recording paper.

Even in this state, the leading end **6*a* of the recording paper 6 eats into the portion of intersection between the first and second guide members 14 and 16** due to the wedge effect and therefore does not slip off.

After a sheet of recording paper has been cut in this manner, subsequent sheets of recording paper are cut successively in a similar manner, and the subsequent sheet of recording paper is surely guided to the bottom of the receiving space 15 along the preceding recording paper already cut and depending, and is cut with its leading end feeding into the bottom of the receiving portion between the second guide member 16 and the recording paper having already fed thereinto due to the wedge effect.

Such a series of operations of the recording paper sheets 6 are repeated and recording paper sheets are accumulated in the tray 13.

When the number of recording paper sheets thus accumulated exceeds the receiving capacity of the tray, first guide member holding means for restraining the first guide member 14 forming the wedge-shaped sheet material receiving space in its operative position is automatically released by the weight of the recording paper sheets 6 or by deenergization of the electromagnet, and the first guide member 14 is moved to its non-operative position to prevent jamming of paper in the apparatus. (The details of this will later be described.)

The distance between the sheet discharging portion, namely, the cutter 11 in the illustrated embodiment, and the blockading portion 19 for gripping the leading end 6' of the recording paper 6 is shorter than the length of the recording paper 6 in the direction of feeding (30 cm in case, for example, recording paper of size 4 is used). Accordingly, when the recording paper has been fed into the receiving space 15, the recording paper is held in the tray with its leading end gripped by the blockading portion 19 and its trailing end depending outwardly of the apparatus. Thus, when a number of recording paper sheets have been successively fed in, these recording paper sheets can be successively received into the receiving tray in the above-described condition. Since the recording paper sheets are held in the tray in such a condition, the bundle of recording paper sheets can be easily pulled out of the tray by grasping its trailing end portion depending from the tray when the recording paper sheets are to be taken out after completion of the recording operation. Also, each recording paper sheet is held in the tray in its reversed state and therefore, the paginating operation heretofore required of the conventional tray is unnecessary.

To obtain the effect of the present invention as described above, in a facsimile apparatus, even where the amount of information transmitted and recorded thereby is very small, a blank space may be provided to the discharged recording paper so that the aforementioned predetermined length of the recording paper may be kept as a minimum predetermined dimension. (This will later be described in detail.)

Figure 6:
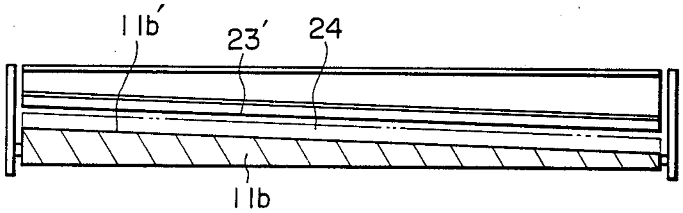
FIGS. 6 and 7 illustrate a safety cover for preventing any danger by the end of the cutting edge of a cutter.

The aforementioned cutter 11 will now be described. The cutter 11 has the movable cutting edge **11*b* rotatable about the shaft 11*a* and the fixed cutting edge 11*c* cooperating with the movable cutting edge, the end 11*b*' of the movable cutting edge 11*b* being inclined at an angle lengthwisely of the cutting edge as shown in FIG. 6 to successively cut the recording paper as if a pair of scissors cut paper. Accordingly, the cutting end portion of the cutting edge 11*b* in the lengthwise direction thereof, namely, the gap 11*d* encircled by a dots-and-dash line in FIG. 7, becomes large and may injure the finger tip when the latter touches the end of the cutting edge. In the structure shown, to prevent such a danger, a guide surface 23'** having an angle of inclination corresponding to the angle of inclination of the end 11*b*′ of the movable cutting edge 11*b* is formed on the extension of the aforementioned guide 23.

Figure 7:
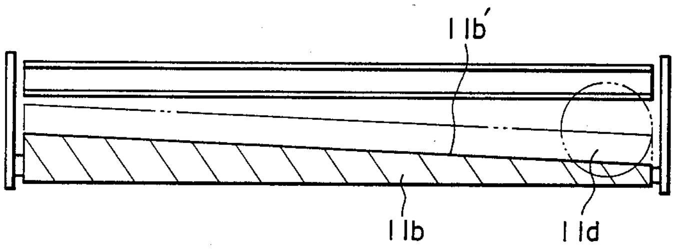
Figure 8:
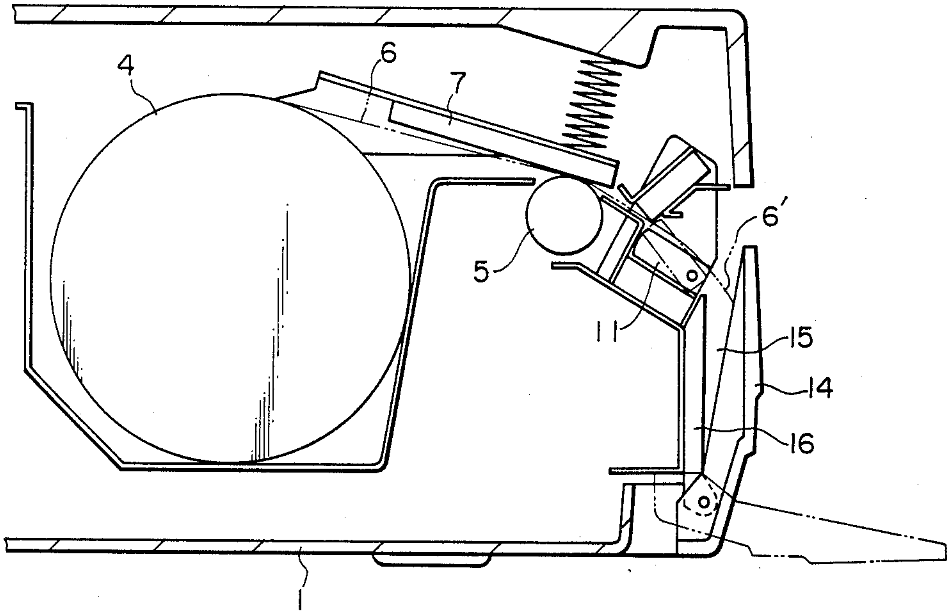
FIGS. 8 to 12 illustrate a series of movements of paper in the paper receiving portion of the tray of the present invention.

Accordingly, in the lengthwise direction of the cutting edge, the gap 24 between the end 11*b*′ of the cutting edge and the guide surface 23′ varies always at the same rate and, even when the gap opens to its maximum, there is not formed the gap 11*d* into which the finger tip can enter as shown in FIG. 7 and thus, there is no possibility of the finger tip touching the end 11*b*′ of the cutting edge and being injured thereby. That is, the above-described guide 23 not only performs the function of guiding the loop-like recording paper 6 outwardly of the apparatus, but also performs the function as a safety cover for protecting the finger tip of the operator.

Reference is now had to FIGS. 8 to 12 to describe the operation of receiving sheet materials into the sheet material receiving tray according to the present invention.

FIGS. 8 to 12 show the operation in a case where a quantity of recording paper sheets corresponding to the receiving capacity of the receiving space 15 formed by the aforementioned first and second guide members is to be received.

Figure 9:
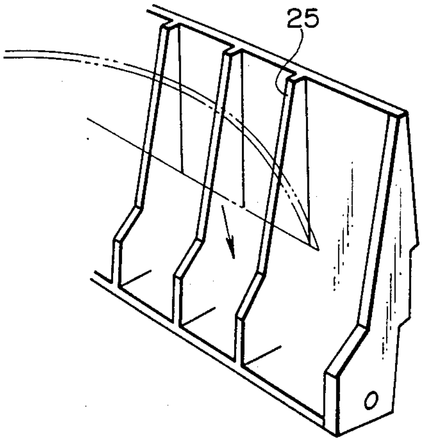
Figure 10:
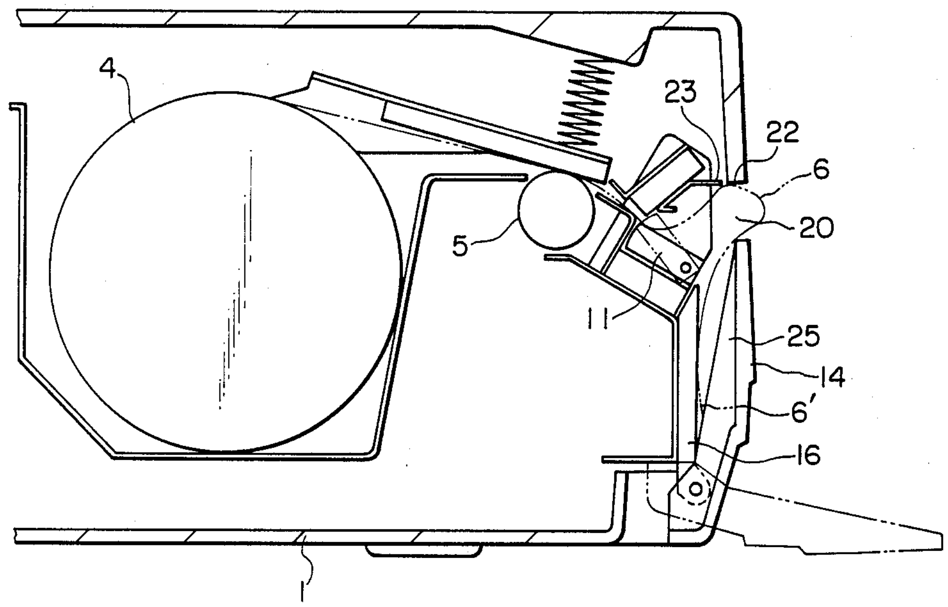

First, the thermosensitive recording paper 6 paid away from a roll 4 is heated by a thermal head 7 in accordance with information and image information is recorded on the surface of the recording paper 6. Thereafter, the recording paper 6 is conveyed by rotation of a platen roller 5 as shown in FIG. 9, and passes through the cutter 11, and the leading end thereof comes to bear against the first guide member 14 forming the wedge-shaped or V-shaped receiving space 15, at an obtuse angle. A plurality of ribs 25 are provided on the inner wall surface cf the first guide member 14 to reduce the contact resistance with the leading end of the recording paper and smoothly direct the leading end of the recording paper into the receiving space 15 of the receiving tray 13. In that case, due to the wedge effect, the leading end 6′ of the recording paper 6 eats into the blockading portion at the bottom of the receiving space. As the recording paper is continuously fed out in this state, the recording paper 6 forms a loop from the opening portion 20 as shown in FIG. 10, and this loop is discharged out of the apparatus with the upper surface of the guide 23 and the end surface of the upper case 22 as the guide surfaces and at last, the recording paper becomes greatly curled and depending outwardly of the apparatus body as shown in FIG. 11.

Figure 12:
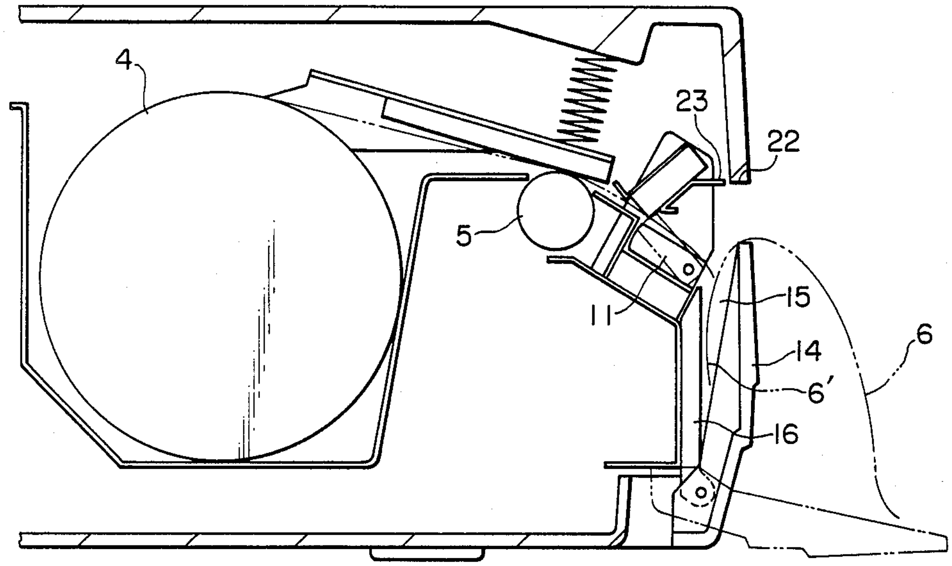

When the cutter 11 is operated in this state and cuts off the trailing end portion of the recording paper 6, the recording paper depending outwardly of the apparatus is reversed in the direction of arrow by utilization of its own weight and the rotational force of the cutting edge of the cutter and the recording paper assumes the state of FIG. 12 wherein the leading end 6′ thereof is seized in the blockading portion of the wedge-shaped receiving space and the trailing end thereof depends outwardly of the apparatus. Such a series of operations of the recording paper 6 are repeated and recording paper sheets are accumulated in the tray 13.

Description will now be made of the receiving operation in a case where a great quantity of recording paper exceeding the receiving capacity of the receiving space 15 is fed out.

In this case, the first guide member 14 is moved to a substantially horizontal open position as shown in FIG. 4. At this time, the first guide member 14 forms a discharge guide portion. With the first guide member 14 thus moved to its open position, the external receiving device 33 shown in FIG. 17(*a*) or the external receiving device 33′ shown in FIG. 17(*b*) is connected to the first guide member 14 or the body 1 or the second guide member 16. The recording paper fed out from the facsimile apparatus is conveyed on the first guide member 14 and received into the external receiving device 33 or 33′.

Figure 13A:
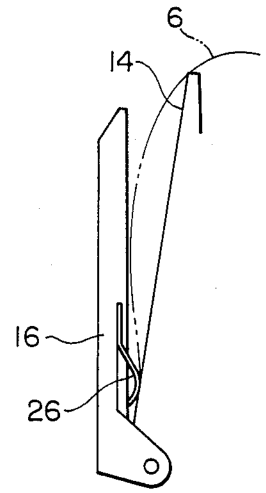
FIGS. 13(*a*), (*b*) and (*c*) illustrate an application of the paper receiving portion of the tray of the present invention.
Figure 13B:
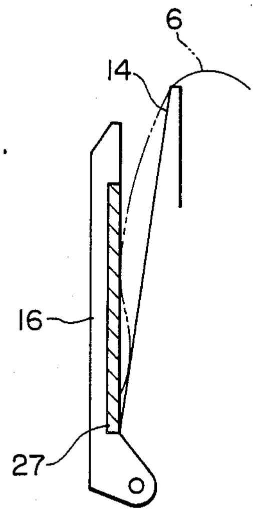
Figure 13C:
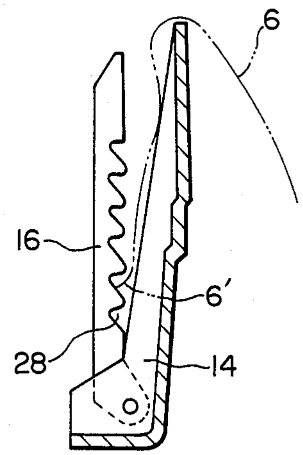

Modifications of the receiving tray for more effectively seizing the leading end 6′ of the recording paper at that time are shown in FIGS. 13(*a*), (*b*) and (*c*).

FIG. 13(*a*) shows a tray having a plate spring attached to the lower portion of the second guide member 16 and adapted to reliably seize the leading end 6′ of the recording paper. That is, if a plate spring 26 having one end thereof fixed to the second guide member 16 is provided at the bottom of the space between the first and second guide members 14 and 16 and the free end of the plate spring 26 is curved so as to be able to contact the bottom of the inner side surface of the first guide member 14, the leading end 6′ of the recording paper 6 can be caused to reliably feed into the space between the plate spring 26 and the first guide member 14 and be held thereby.

Seizing the leading end of the recording paper by the plate spring 26 in the foregoing, and seizing and supporting the recording paper whose trailing end is depending outwardly of the apparatus after the recording paper has been received, by the same plate spring 26, will now be described further. Assuming that the force with which the recording paper tries to slip out of the plate spring 26 due to its depending is $f_1$ and the seizing force which tries to block it due to the spring force of the plate spring 26 is F, if these forces are in the relation that $F+C>f_1$ (C is the contact resistance between the recording paper and the first guide member), the recording paper will be restrained from slipping out.

On the other hand, when the leading end of the recording paper is directed into the receiving tray and seized by the plate spring 26, the posture of the recording paper is corrected in the narrow sheet space and it becomes difficult for such a phenomenon as the so-called weakening of the paper to occur and accordingly, the conveying force provided by the platen roller is efficiently transmitted to the leading end of the recording paper. Assuming that this transmitted conveying force is $f_2$ and considering the force which hampers the seizing by the plate spring 26 to be substantially similar to said force F, if these forces are in the relation that $F+C<f_2$, it will be understood that the seizing of the leading end of the recording paper by the plate spring 26 is accomplished. Generally, $f_1$ and $f_2$ are in the relation that $f_1<f_2$ and therefore, there is no impediment in satisfying the aforementioned relation and the present embodiment is realized by empirically setting the shape of the plate spring 26, the value of the spring force, etc.

FIG. 13(*b*) shows a modification in which a friction material such as rubber is attached to the surface of the second guide member 16 to prevent the end of the paper from deviating up due to friction force. That is, in the present embodiment, there is adopted a structure in which a plurality of friction members 27 such as rubber are provided along the entire inner side surface of the second guide member 16 and at predetermined intervals widthwisely of the second guide member 16.

Such a structure also enables the leading end 6′ of the recording paper to be reliably held at the bottom of the space formed between the friction members 27 and the first guide member 14.

FIG. 13(*c*) shows a modification in which saw-tooth-like unevenness is provided on the surface of the second guide member and the end of the paper may be hooked thereto to prevent the paper from deviating up. That is, in the present embodiment, an uneven portion 28 is formed on the inner side surface of the second guide member 16. The formation of such uneven portion 28 may cause the leading end 6' of the recording paper 6 to be caught between the uneven portion 28 and the first guide member 14 and reliably held thereby.

In each of the above-described embodiments, the receiving space 15 has been shown as a space of V-shaped cross-section, whereas this space need not always be V-shaped but the first and second guide members 14 and 16 may be somewhat spaced apart from each other at their lower ends. However, in any of these structures, provision of a V-shaped groove would be effective.

Also, when the number of recording paper sheets accumulated in the tray exceeds the receiving capacity of the tray, a click mechanism for restraining the first guide member 14 forming a wedge-shaped sheet material receiving space in its closed state is automatically released by the weight of the recording paper 6 to thereby open the first guide member 14, thus preventing jamming of the paper in the apparatus. Some examples of the click mechanism are shown in FIGS. 14, 15 and 16.

Figure 14:
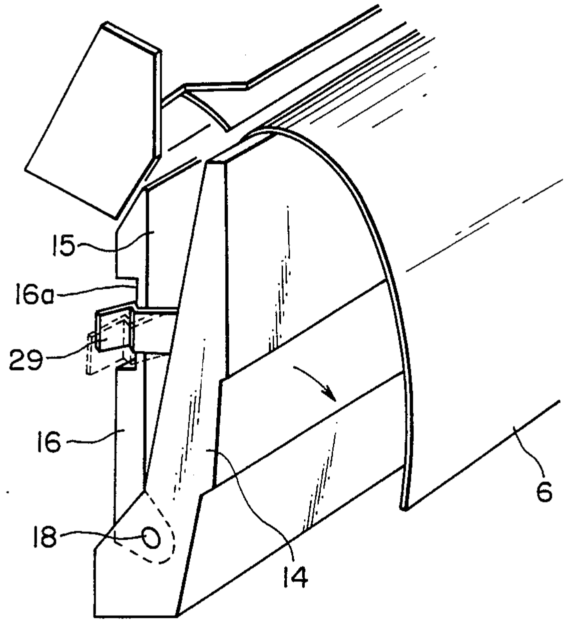
FIGS. 14 to 16 illustrate a click mechanism concerned with the opening-closing of the paper receiving portion of the tray of the present invention.

FIG. 14 shows a click mechanism using a resilient member such as a plate spring. That is, the present embodiment adopts a structure in which a bent plate spring 29 is provided on the side edge of the first guide member 14 and the bent portion of the plate spring 29 is engaged with the cut-away portion 16*a* of the second guide member 16 to hold the first guide member 14 in its substantially upright condition.

If such a structure is adopted, the plate spring 29 will not be resiliently deformed unless a great extraneous force, namely, the extraneous force during the opening operation by the operator's hand or the weight of the recording paper sheets 6 accumulated in the receiving space 15 which exceed the receiving capacity of such space is applied to the plate spring, and the first guide member 14 can be held in its closed state.

Figure 15:
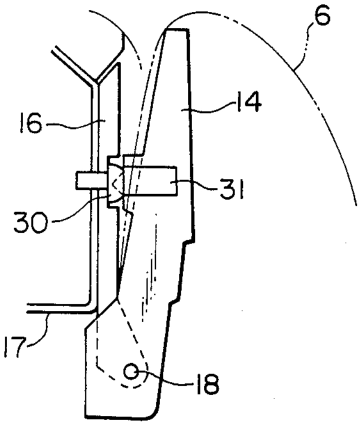
Figure 16:
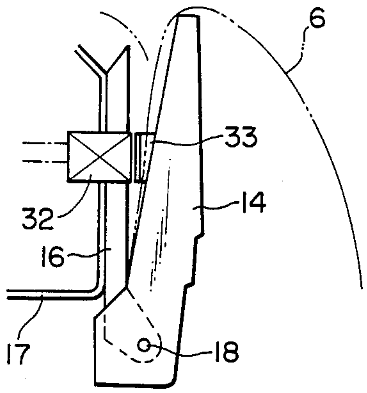

FIG. 15 shows a magnetic force type mechanism in which a magnet attracted by a magnetic force to a screw which secures the second guide member 16 to the body stay 17 is provided on the first guide member. That is, in the present embodiment, an iron screw 30 is provided on the second guide member 16 side and a magnet 31 is provided on the first guide member 14 at a position corresponding to the screw 30.

The present embodiment is constructed as described above and therefore, in the closed positicn of the first guide member 14, the screw 30 is attracted to the magnet 31 and thus, the first guide member will not open unless the weight of the recording paper or any extraneous force such as the operating force by the operator is applied thereto.

Also, FIG. 16 shows a click mechanism in which an electromagnet 32 is provided on the second guide member to thereby attract the first guide member and when a predetermined number of recording paper sheets has been received, the electromagnet 32 is deenergized to cause the first guide member to be opened.

If such a structure is adopted, the iron pipe 33 is attracted as long as electric power is supplied to the electromagnet 32 and thus, the first guide member 14 keeps its closed position, but when the power supply is cut off, the attraction of the electromagnet 32 disappears to permit the first guide member 14 to automatically open.

Figure 18:
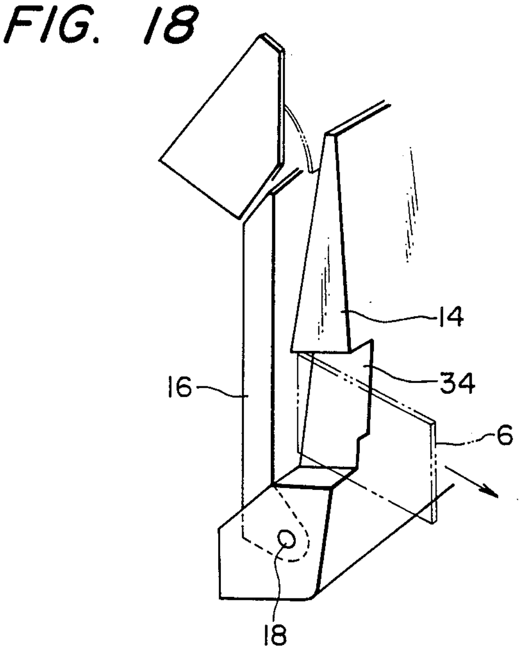
FIGS. 18 and 19(*a*) and (*b*) illustrate the tray of the present invention provided with a cut-away or a slot in the paper receiving portion thereof to receive narrow paper.

FIG. 18 illustrates another embodiment of the present invention in which a cut-away portion 34 is formed in the side edge of the first guide member 14. If such a cut-away portion 34 is formed, even when the recording paper 6 has been cut narrowly, the first guide member 14 will not open and permit the recording paper 6 to be taken out from the side thereof.

Figure 19A:
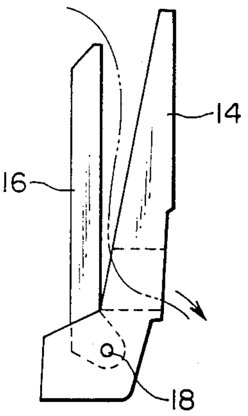
Figure 19B:
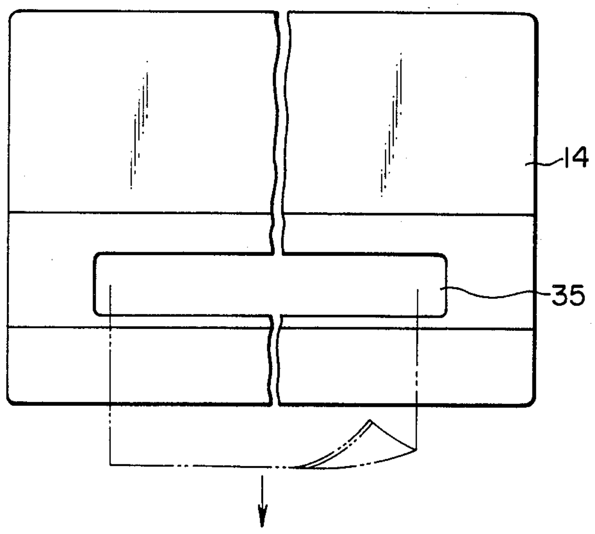

FIGS. 19(*a*) and (*b*) illustrate still another embodiment of the present invention in which an opening portion 35 of a predetermined size is continuously formed in the lower portion of the first guide member 14 along the widthwise direction thereof. If such an opening portion 35 is provided, the recording paper 6 can be taken out without the first guide member 14 being opened if the width of the recording paper is within the range of the length of the opening portion 35.

Figure 20A:
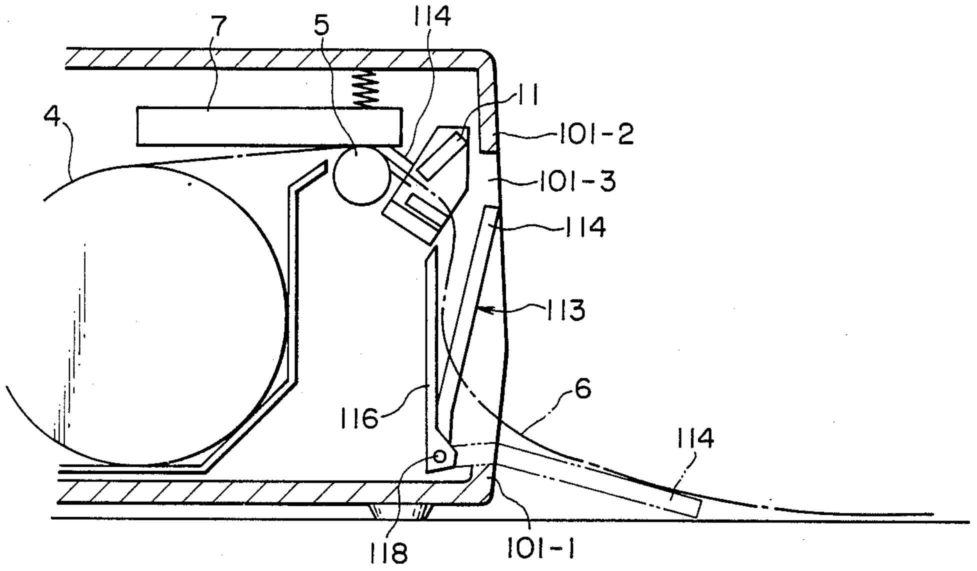
FIGS. 20(*a*) and (*b*) illustrate different methods of use of the recording portion and the recording paper receiving portion of a facsimile apparatus using another embodiment of the present invention.
Figure 20B:
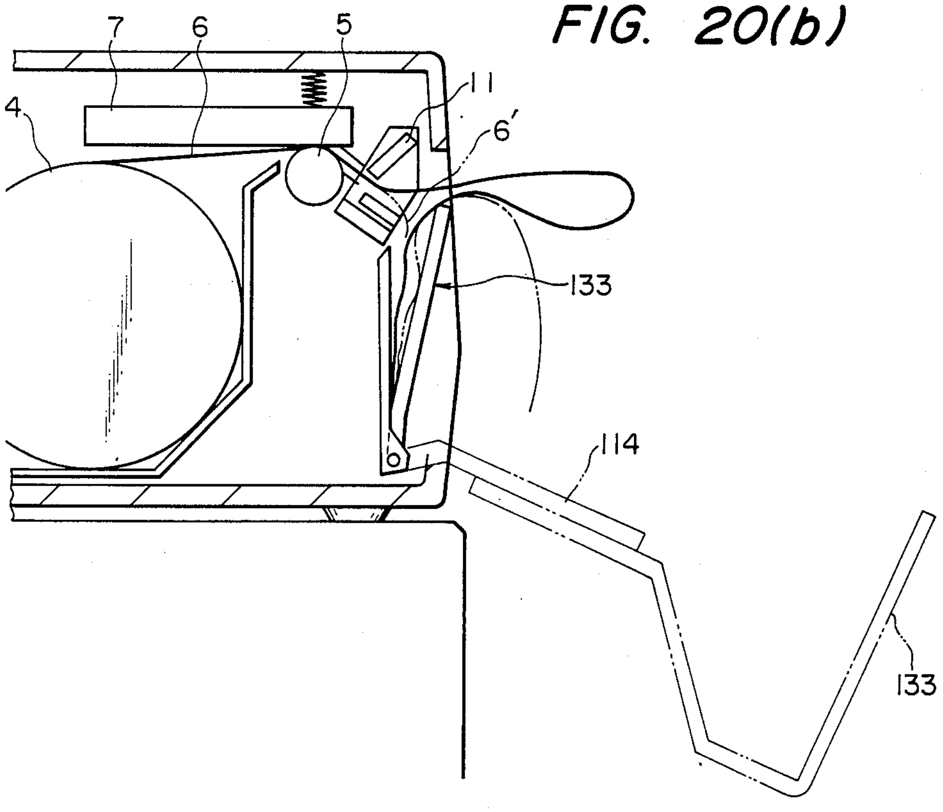

FIGS. 20(*a*) and (*b*) illustrate yet still another embodiment of the present invention. In FIGS. 20(*a*) and (*b*), members given reference numerals similar to those in FIG. 1 are similar to those of FIG. 1.

A receiving tray 113 is comprised of a second guide member 116 comprising a plastic plate fixedly provided on the frame, not shown, of a body 101 and a first guide member 114 comprising a plastic plate rotatably fixed to the lower end of the guide member 116 by a pin 118 and positioned downstream with respect to the direction of conveyance of the paper (the first and second guide members need not always be plate-like but may comprise a plurality of wires arranged longitudinally and briefly, may be any members which can block movement of the recording paper).

A click mechanism, not shown, for restraining the first guide member 114 in its state as shown in FIG. 20(*a*) is provided between the body and the first guide member 114 and, when the first guide member is opened by rotating it about the pin 118, the first guide member is restrained in its state as indicated by dots-and-dash line by the lower case 101-1 of the body 101.

In its open position, the first guide member 114 forms a discharge guide portion because the recording paper 6 discharged moves along the first guide member 114.

In the closed position of the first guide member 114 (the position indicated by solid line in FIG. 20(*a*)), a clearance 101-3 sufficient to permit the loop-like recording paper 6 to be discharged is formed between the upper end of the first guide member 114 and the upper case 101-2 of the body 101.

Since the distance over which the recording paper 6 travels along a paper guide path 114 until it arrives at the first guide member 114 is short, the angle formed between the direction of conveyance of the recording paper and the first guide member 114 is an obtuse angle.

The leading end 6' of the recording paper 6 (see FIG. 20(*b*)) is directed into the wedge-shaped groove of the receiving tray 133 and seized by the bottom of the groove while at the same time the recording paper is fed out with the trailing end of the continuously fed recording paper 6 being reversed outwardly of the apparatus by utilization of the resiliency of the paper, whereby reception of the recording paper is completed with the leading end cf the recording paper 6 being seized in the apparatus and the trailing end thereof depending outwardly of the apparatus and thus, the operation can be connected to the reception of the next recording paper sheet.

Also, by opening the first guide member 114 forming the wedge-shaped groove as indicated by dot-and-dash line in FIG. 20(*b*) and connecting an external tray 133 thereto, there is obtained the effect that more recording paper sheets can be received in the tray.

Figure 21:
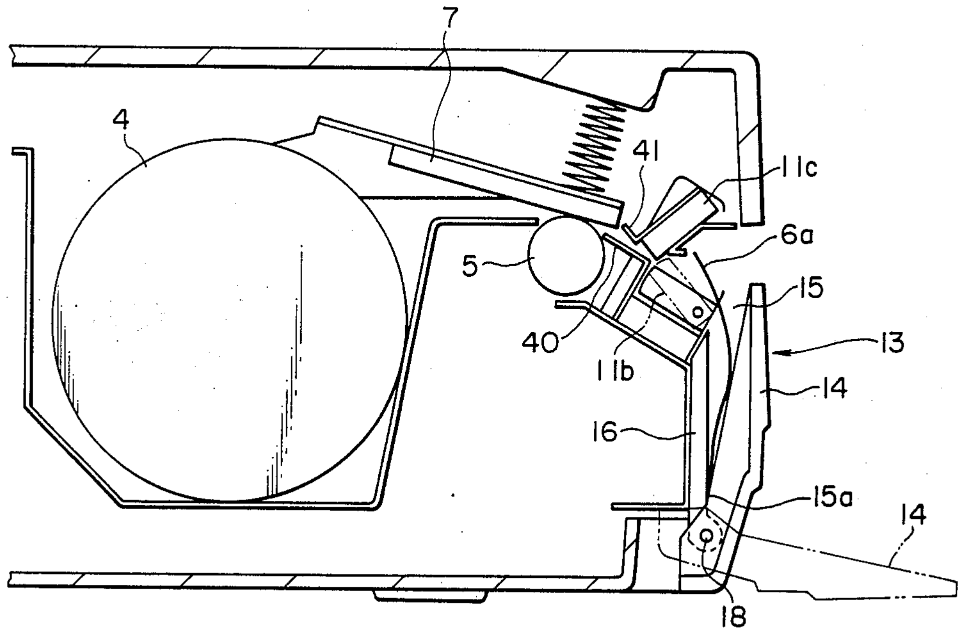
FIGS. 21 and 22 are longitudinal cross-sectional side views of still another embodiment of the present invention.

FIGS. 21 and so on illustrate still another embodiment of the present invention. In these FIGS., portions similar to those of FIGS. 2 to 3 are given similar reference numerals and need not be described.

Figure 22:
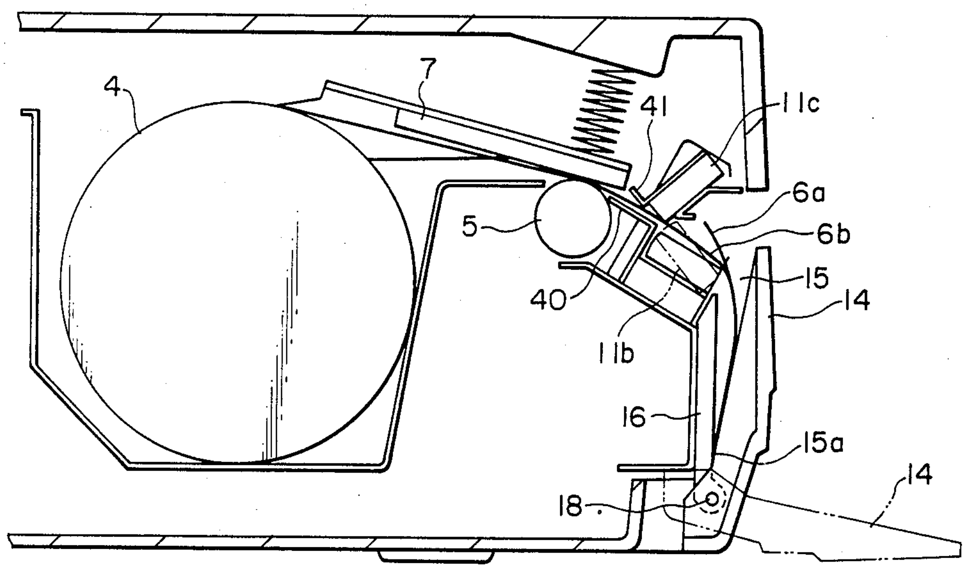
Figure 23:
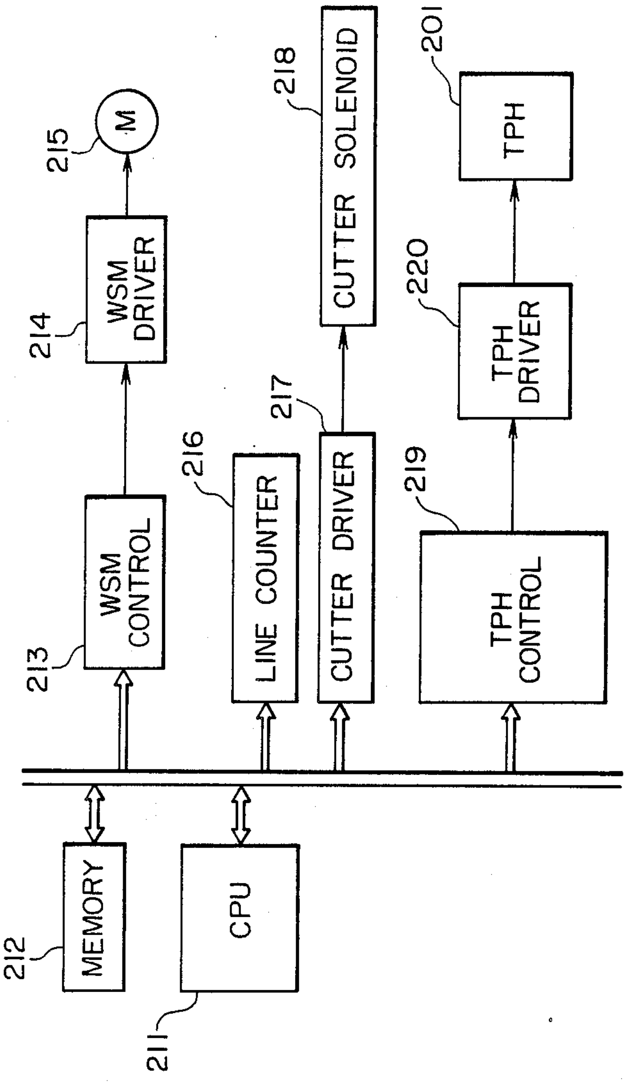
FIG. 23 is a block diagram of a control circuit.

In FIGS. 21 and 22, there is shown a recording apparatus substantially similar in mechanism to the recording apparatus shown in FIGS. 2 to 3, but this apparatus is provided with a control circuit as shown in FIG. 23.

Designated by 211 in FIG. 23 is a CPU (central processing unit) for controlling the entire system, and a memory 212 is connected to a motor control circuit 213 for driving a stepping motor 215 through a driver 214.

The stepping motor 215 is a motor for feeding the recording paper by one line each.

Designated by 216 is a line counter for counting the number of print lines.

Denotes by 218 is a cutter solenoid for driving the cutter 11. The cutter solenoid 218 is driven through a cutter driver 217.

Designated by 219 is a head control device for driving and controlling a recording head 7 constructed as a thermosensitive head, through a driver 220.

Figure 24:
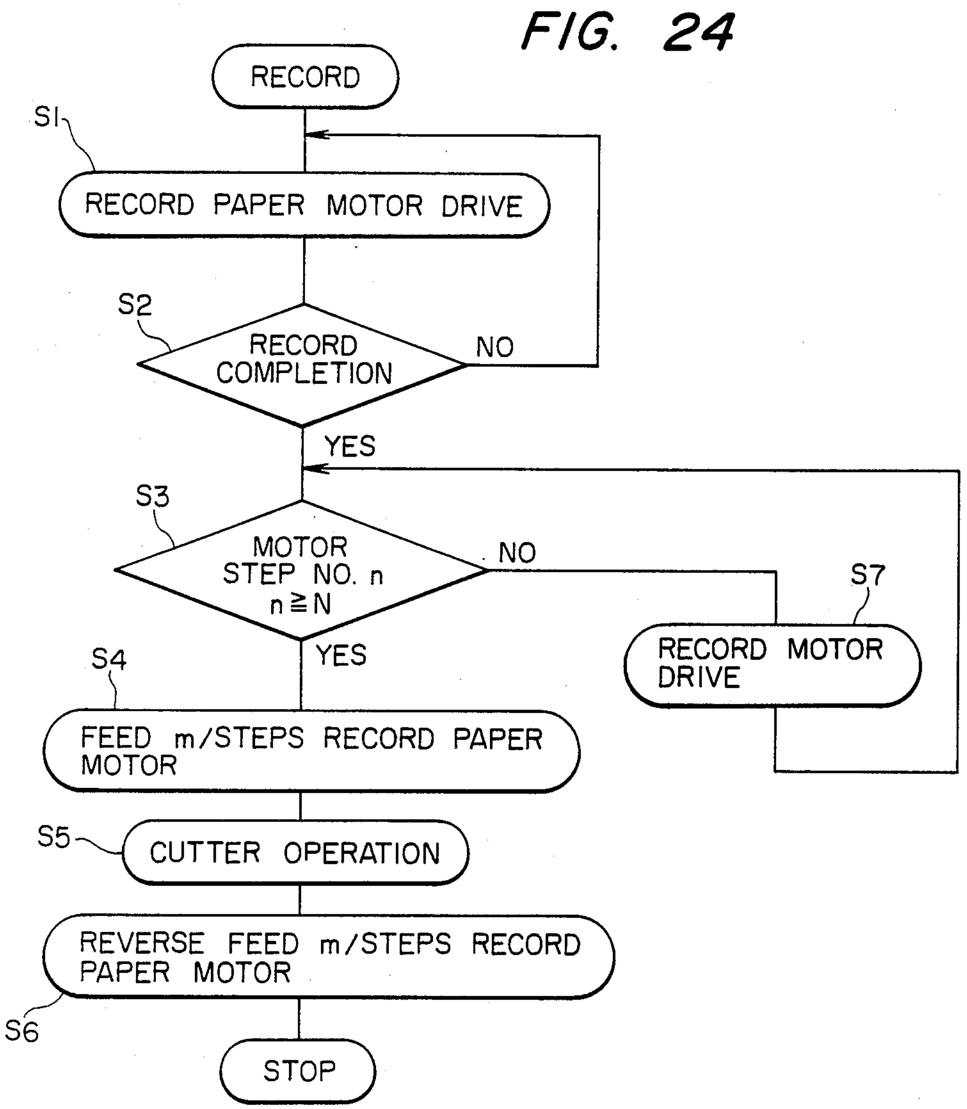
FIG. 24 is a flow chart illustrating the control operation.

When recording is started under the construction as described above, the control operation as shown in the flow chart of FIG. 24 is effected.

That is, at step S1 the CPU revolves the stepping motor 215 through the stepping motor control circuit 213 and the driver 214.

With the revolution of the stepping motor 215, the number of steps of the stepping motor 215 is counted by the line counter 216.

On the other hand, the head control device 219 drives the recording head 7 through the driver 220 in accordance with a recording signal.

The above-described operation is effected until recording is completed.

When it is judged at step S2 that recording has been completed, the program proceeds to step S3 and whether the number n of steps of the stepping motor has reached the number N of steps pre-stored in the memory 212 is judged.

When n=N is judged at step S3, the program proceeds to step S4 and the stepping motor 215 is revolved by m steps to provide a sufficient blank space for cutting the recording paper, and the recording paper is directed toward the receiving space 15 and at step S5, the cutter 11 is driven to cut the recording paper and at step S6, the stepping motor 215 is reversed by m steps, whereafter the control is stopped.

On the other hand, when n<N is judged at step S3, the program proceeds to step S7 and the stepping motor 215 is revolved unitl n=N is reached.

When n=N has been reached, the program proceeds to steps 4 and so on as previously described.

If such a recording paper cutting method is adopted, the recording paper is cut to a predetermined length without fail irrespective of the record length.

Figure 25:
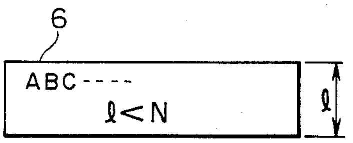
FIG. 25 is a plan view of recording paper cut to a short length.
Figure 26:
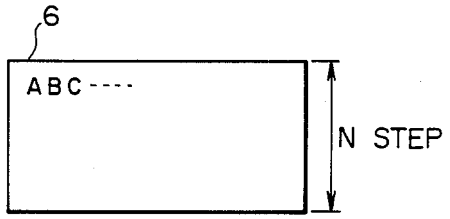
FIG. 26 is a plan view of recording paper cut to a predetermined length.

That is, as shown in FIG. 25, the recording paper 6 is not cut to the length of l steps shorter than the preset N steps, but is cut to the length corresponding to the N steps without fail even if the number of print lines is minute as shown in FIG. 26.

As a result, the first recording paper sheet is received into the receiving space 15 as indicated at 6*a* in FIG. 21, and even if that paper sheet is received in the receiving space with its lower end being in contact with the bottom 15*a* of the receiving space 15, the upper end of that paper sheet can be positioned near the cutter 11 without fail and thus, even when the second recording paper sheet 6*b* has been discharged as shown in FIG. 22, it is received inside the first recording paper sheet 6*a* without fail.

Accordingly, if design is made such that the length of the recording paper fed by the preset number N of steps of the stepping motor 215 is, for example, the length from the vicinity of the cutter 11 to the bottom 15*a* of the receiving space 15 with the curl of the recording paper taken into account, all the recording paper sheets are cut to the same length and the recording paper will not jut out of the recording apparatus as has heretofore been experienced.

Figure 27:
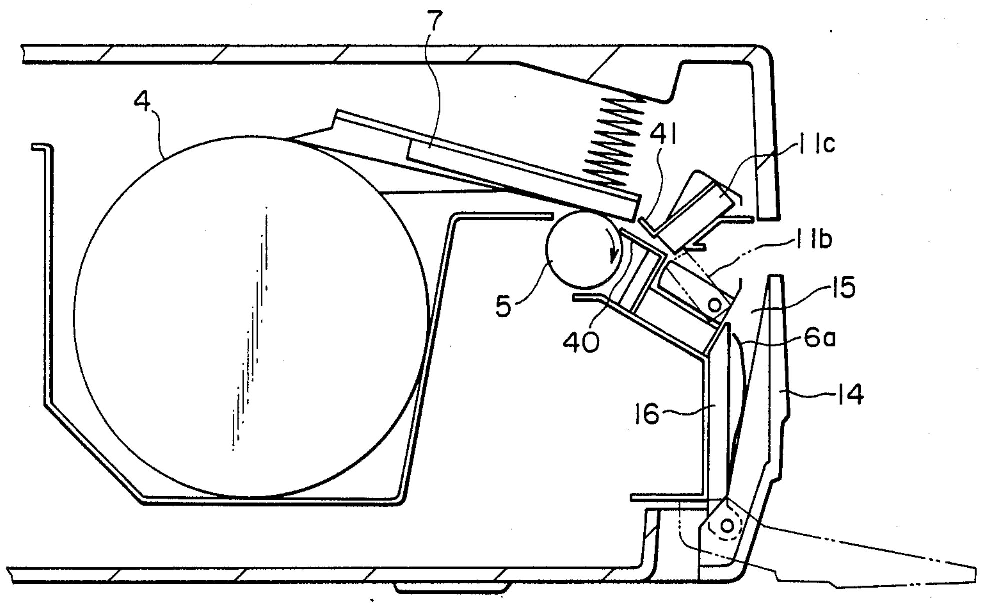
FIGS. 27 to 29 are longitudinal cross-sectional views illustrating the inconvenience occurring when the apparatus is not provided with the feature of the embodiment of FIG. 21.
Figure 28:
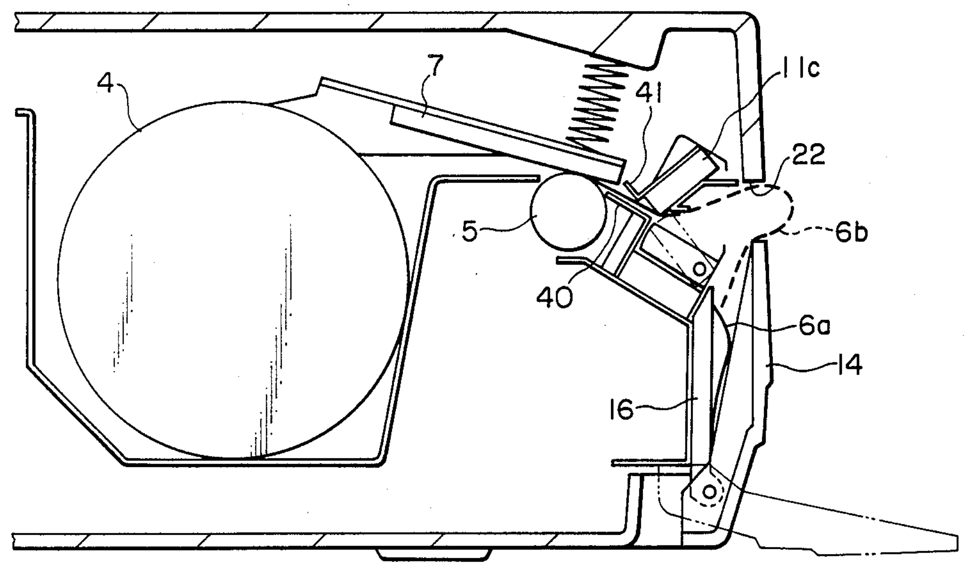
Figure 29:
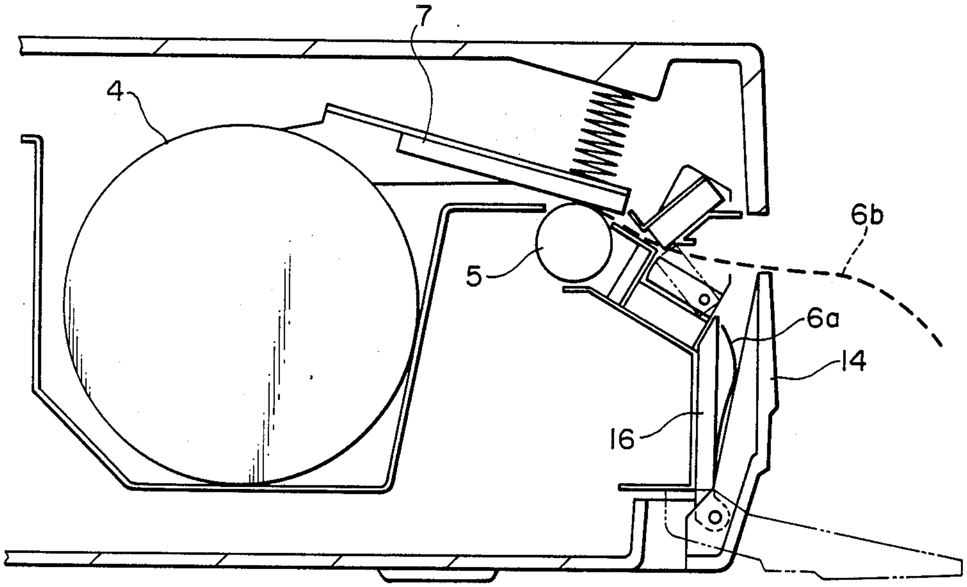

In the case of a construction which is not provided with such a feature as shown in FIGS. 21–26, there occurs an inconvenience as shown in FIGS. 27–29. That is, when the cut recording paper sheet 6*a* is short as shown in FIG. 27 and substantially the whole thereof is received into the receiving space 15, the cut recording paper sheet 6*a* is positioned in the receiving portion while remaining curled.

If the second recording paper sheet 6*b* is fed in this state, the leading end of this recording paper sheet 6*b* comes into contact with the first recording paper sheet 6*a* as shown in FIG. 28 and cannot advance downwardly because of the curling of the recording paper sheet 6*a*, but its intermediate portion becomes curved and juts out from the opening portion 20 of the apparatus and soon, the second recording paper sheet 6*b* jumps out of the apparatus as shown in FIG. 29 and thus cannot be received into the receiving space.

We claim:

1. In combination, a sheet material receiving device and an image forming apparatus, comprising:

sheet material grip means for gripping a front end side of a sheet material conveyed thereto;

a discharge port for discharging therefrom a rear end side of the sheet material gripped by said sheet material grip means; and a support member for supporting the sheet material the front end side of which is gripped and the rear end side of which is discharged, said support member being located substantially vertically above the sheet material grip means, wherein said grip means is disposed inside of said image forming apparatus, and wherein said support member is openable and closable and constitutes a portion of an outer wall of said image forming apparatus when closed.

2. A receiving method for receiving a sheet material in a sheet material receiving device, said method comprising the steps of:

feeding a roll-like sheet material by feeding means;

further feeding the sheet material fed with a leading edge thereof being introduced downwardly by a guide member;

gripping the leading edge of the sheet material fed by a sheet grip means which comprises a pair of opposing members one of which is positioned outwardly and extends substantially vertically to form an upper support portion;

continuing feeding of the sheet material the leading edge of which is gripped to form a loop by guiding an intermediate portion of the sheet material by a guide member positioned above the upper support portion, thereby sending out the sheet material from a discharge port formed above the upper support member, substantially expanding to assume a U-shape configuration with the arms of the "u" pointing downward;

further continuing feeding of the sheet material to make the expanding loop portion of the sheet material larger, thereby guiding the sheet material by the upper support portion to depend downward;

cutting the sheet material by a cutter provided in the vicinity of the discharge port after a predetermined amount of feeding of the sheet material has been finished;

cancelling the expanded portion by dropping a trailing edge of the cut sheet material from the discharge port; and guiding the intermediate portion of the sheet material by the upper support portion with the leading edge thereof gripped to cause the trailing edge thereof to depend substantially vertically, whereby the sheet material is received.

3. In combination, a sheet material receiving device and an image forming apparatus, comprising:

sheet material grip means for gripping a front end side of a sheet material conveyed thereto;

a discharge port for discharging therefrom a rear end side of the sheet material gripped by said sheet material grip means; and a support member for supporting the sheet material the front end side of which is gripped and the rear end side of which is discharged, said support member being located substantially vertically above said sheet material grip means, wherein said support member is arranged to reside substantially on the same plane as an outer wall surface of said image forming apparatus, and wherein said discharge port is formed between an upper edge of said support member and a lower edge of said outer wall, and wherein said support member is pivotally supported.

4. A sheet material receiving device usable with an image forming apparatus, said device comprising:

sheet material grip means for gripping a front end side of a sheet material conveyed thereto;

a discharge port for discharging therefrom a rear end side of the sheet material gripped by said sheet material grip means; and a support member for supporting the sheet material the front end side of which is gripped and the rear end side of which is discharged, said support member being located substantially vertically above said sheet material grip means, wherein said grip means comprises two members intersecting each other in such a manner that a bottom portion of one member enters a recess formed at a bottom portion of the other member of said grip means, and said members of said grip means being pivotally attached to each other to form a grip portion, and wherein said support member comprises a substantially vertical extension of one of said grip members.

5. A device according to claim 4, wherein one said member of said grip means is pivotally journaled on the other said member at the bottom.

6. In combination, a sheet material receiving device and an image forming apparatus, comprising:

sheet material grip means for gripping a front end side of a sheet material conveyed thereto;

a discharge port for discharging therefrom a rear end side of the sheet material gripped by said sheet material grip means; and a support member for supporting the sheet material the front end side of which is gripped and the rear end side of which is discharged, said support member being located substantially vertically above said sheet material grip means, wherein said grip means includes an outer member which is arranged to reside substantially on the same plane as an outer wall of said image forming apparatus, and wherein said discharge port is formed between an edge of said outer member and an edge of said outer wall.

7. A device according to claim 6, wherein said grip means is a guide for guiding downward the front end of the sheet material conveyed after image formation thereon, to lead it to a grip portion.

8. A device according to claim 7, wherein said grip means is arranged to be open at the upper side and closed at the bottom side so as to form a substantially V-shaped space, said grip means thereby gripping the sheet material at the bottom side.

9. A device according to claim 7, wherein said grip means further comprises an inner member for resiliently gripping the sheet material in cooperation with said guide of the grip means.

10. A sheet material receiving device usable with an image forming apparatus, said device comprising:

sheet material grip means for gripping a front end side of a sheet material conveyed thereto, said grip means comprising two grip members engaging each other at a bottom portion thereof;

a discharging port for discharging therefrom a rear end side of the sheet material gripped by said sheet material grip means;

a support member for supporting the rear end side of the sheet material the front end side of which is gripped by said grip means and the rear end side of which is discharged from said discharge port, said support member being located substantially vertically above said sheet material grip means and said support means comprising an extension of one of said grip members, wherein said support member is a guide member for downwardly guiding the sheet material discharged from said image forming apparatus; and holding means for holding said guide member such that the guide member may take a sheet material receiving position and an inoperative position where the sheet material, having been received, may be released.

11. A sheet material receiving device according to claim 10, wherein said holding means comprises a member for automatically making said guide member inoperative when the number of the sheet materials received on the receiving portion exceeds the capacity of the receiving portion for receiving the sheet material.

12. A sheet material receiving device according to claim 11, wherein said member comprises a magnet.

13. An image forming apparatus provided with a sheet material receiving means, said apparatus comprising:

an apparatus body having an image recording portion for recording an image on a sheet material, and a cutter for cutting the sheet material having an image recorded thereon with a length greater than a predetermined value irrespective of the length of the image recorded by said image recording means;

sheet material grip means for gripping a front end side of a sheet material conveyed thereto;

a discharge port for discharging therefrom a rear end side of the sheet material gripped by said sheet material grip means; and a support member for supporting the sheet material the front end side of which is gripped and the rear end side of which is discharged, said support member being located substantially vertically above said material grip means, wherein said grip means includes an outer member which is arranged to reside substantially on the same plane as an outer wall of the image forming apparatus, and wherein said discharge port is formed between an edge of said outer member and an edge of said outer wall.

14. An apparatus according to claim 13, wherein said support member is a guide member for downwardly guiding the sheet material discharged from said apparatus.

15. An apparatus according to claim 14, further comprising a second guide member to cooperate with said guide member to form a space for receiving the sheet material.

16. An apparatus according to claim 14, further comprising holding means for holding said guide member such that the guide member may take a sheet material receiving position and an inoperative position where the sheet material having been received may be released.

17. An image forming apparatus according to claim 16, wherein said holding means comprises a member for automatically making said guide member inoperative when the number of sheet materials received on the receiving portion exceeds the capacity of the receiving portion for receiving the sheet material.

18. An image forming apparatus according to claim 13, wherein said cutter rotates in a direction of discharge of the sheet material.

19. An apparatus according to claim 13, wherein said cutter forces the sheet material out from the apparatus after the front end of the sheet material is gripped so that the sheet material may depend from said support member.

* * * * *

UNITED STATES PATENT AND TRADEMARK OFFICE
CERTIFICATE OF CORRECTION

PATENT NO. : 4,768,063
DATED : August 30, 1988
INVENTOR(S) : TOSHIAKI KUNISHIMA, ET AL.

It is certified that error appears in the above-identified patent and that said Letters Patent is hereby corrected as shown below:

Column 2,
line 39, "pagenation" should read --pagination--;
line 63, "pagenating" should read --paginating--.

Column 3,
line 40, "cf" should read --of--;
line 48, "copying" should read --coping--.

Column 6,
line 54, "V-shaped" should read --V-shape--.

Column 7,
line 19, "gripped" should read --being gripped--;
line 63, "6a" should read --6'--;
line 64, "eats" should read --feeds--.

Column 8,
line 27, "size 4" should read --size A4--;
line 58, "lengthwisely" should read --lengthwise--.

Column 9,
line 34, "cf" should read --of--;
line 39, "eats" should read --feeds--.

Column 11,
line 57, "positicn" should read --position--.

UNITED STATES PATENT AND TRADEMARK OFFICE

CERTIFICATE OF CORRECTION

PATENT NO. : 4,768,063

DATED : August 30, 1988

INVENTOR(S) : TOSHIAKI KUNISHIMA, ET AL.

It is certified that error appears in the above-identified patent and that said Letters Patent is hereby corrected as shown below:

Column 12, line 56, "114" should be deleted.

Column 13, line 26, "Denotes" should read --Denoted--;

line 61, "unitl" should read --until--.

Column 15, line 10, ""u"" should read --"U"--.

Signed and Sealed this

Twenty-eighth Day of February, 1989

*Attest:*

DONALD J. QUIGG

*Attesting Officer*

*Commissioner of Patents and Trademarks*